No. 866,397. PATENTED SEPT. 17, 1907.
R. H. SMITH.
SPEED AND DISTANCE INDICATING AND RECORDING DEVICE.
APPLICATION FILED DEC. 14, 1906.
2 SHEETS—SHEET 1.
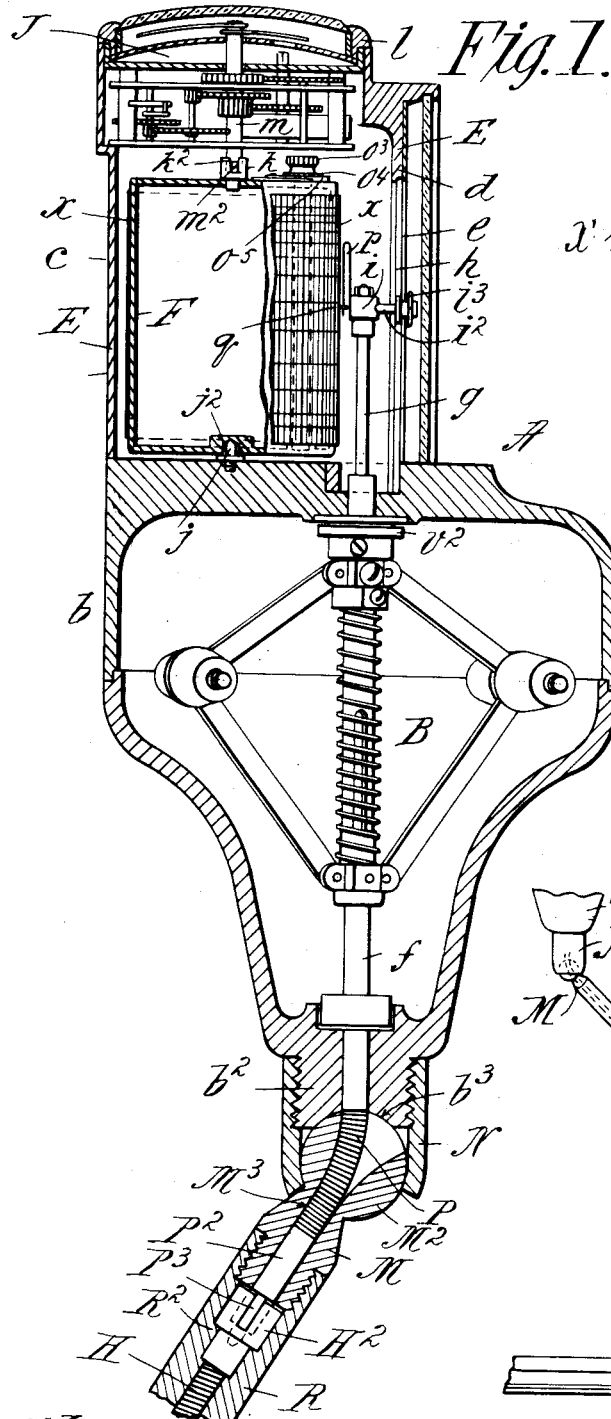
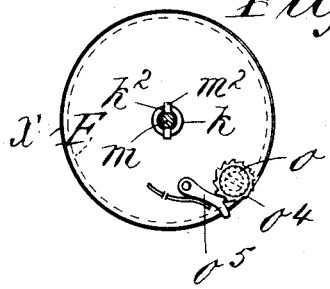
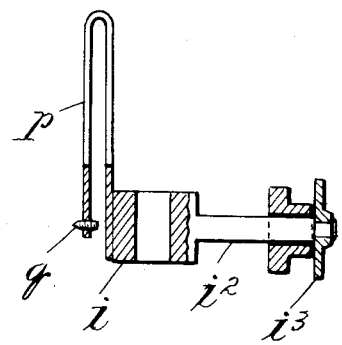
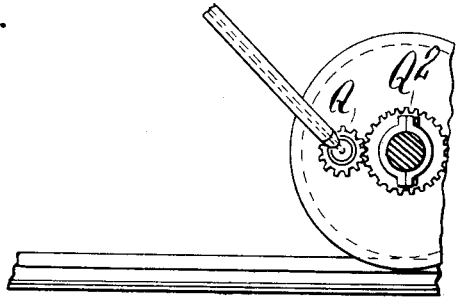
Witnesses:
Inventor,
Richard H. Smith,
by
Attorney.

No. 866,397. PATENTED SEPT. 17, 1907.
R. H. SMITH.
SPEED AND DISTANCE INDICATING AND RECORDING DEVICE.
APPLICATION FILED DEC. 14, 1906.
2 SHEETS—SHEET 2.
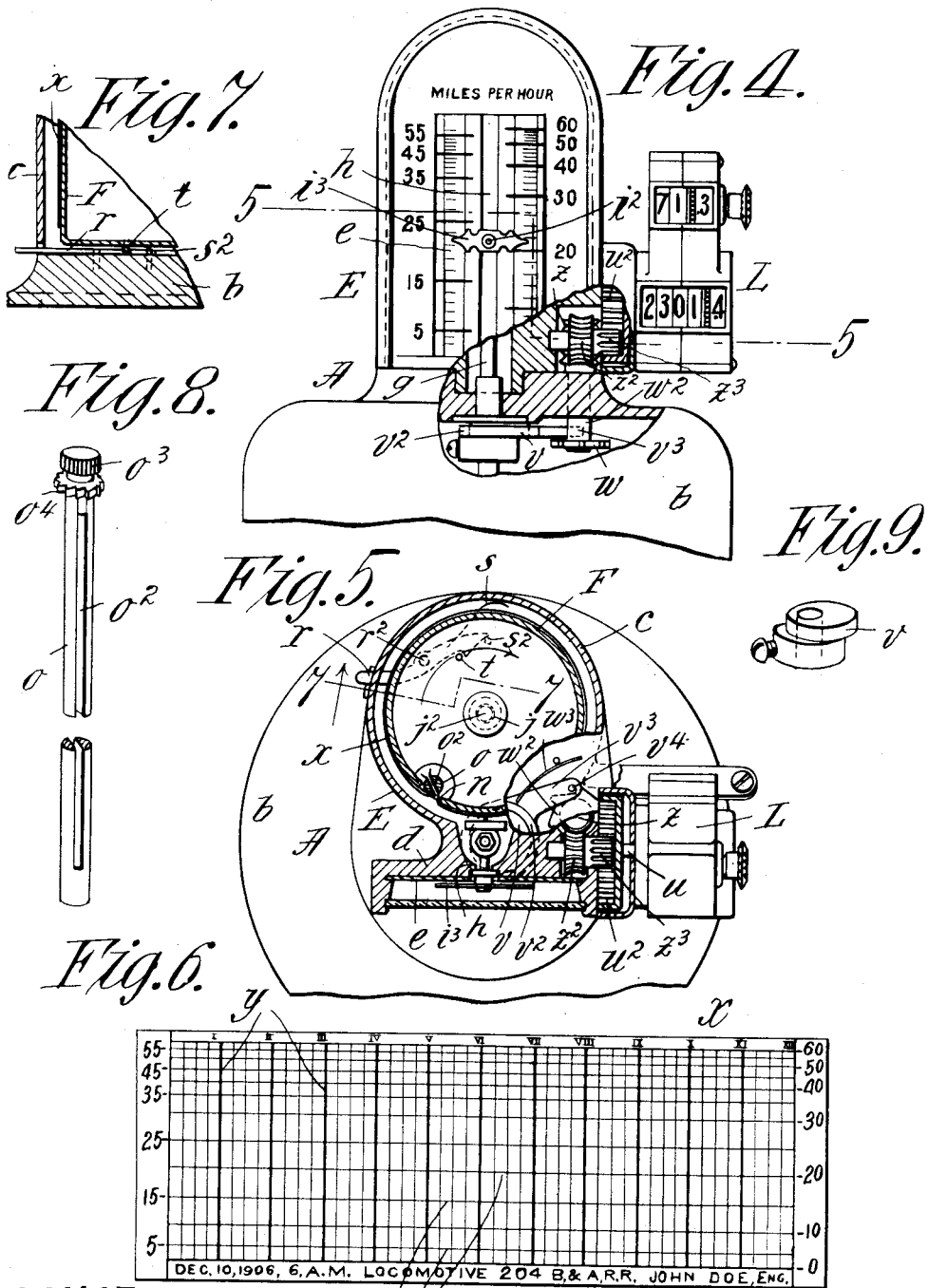
Witnesses:
J. D. Garfield
G. R. Driscoll.
Inventor,
Richard H. Smith
by W. J. Bellina
Attorney,

UNITED STATES PATENT OFFICE.

RICHARD HALE SMITH, OF SPRINGFIELD, MASSACHUSETTS.

SPEED AND DISTANCE INDICATING AND RECORDING DEVICE.

No. 866,397.　　　Specification of Letters Patent.　　　Patented Sept. 17, 1907.

Application filed December 14, 1906. Serial No. 347,833.

*To all whom it may concern:*

Be it known that I, RICHARD HALE SMITH, a citizen of the United States of America, and a resident of Springfield, in the county of Hampden and State of Massachusetts, have invented certain new and useful Improvements in Speed and Distance Indicating and Recording Devices for Vehicles, of which the following is a full, clear, and exact description.

The object of this invention is to provide a mechanism or apparatus to be carried on a vehicle, such for instance as a locomotive or automobile, which will be operative to indicate at all times the speed at which the vehicle is traveling, and to produce a record on a suitable sheet, which on inspection will accurately show the various speeds at which the vehicle has traveled, the times at which such speeds were made, the times between which the vehicle must have been traveling, and furthermore to show the total number of miles or other measure of distance traveled.

The devices in the accomplishment of the foregoing objects are illustrated in the accompanying drawings, in which,—

Figure 1 is substantially a central vertical sectional view through the entire mechanism. Fig. 1$^a$ is a view showing driving connections for the novel mechanism. Fig. 2 is a plan view of the rotative drum on which the record sheet is carried. Fig. 3 is a vertical sectional view of a variably movable part carried by the speed indicator, on which the recording marker is supported. Fig. 4 is an elevation at the upper portion of the speed indicating device with parts broken away, and in section, for particularly showing the driving connections for the odometer. Fig. 5 is a horizontal sectional view as taken on the plane indicated by the section lines 5—5, Fig. 4. Fig. 6 is a face view of the record sheet. Fig. 7 is a sectional view in detail for showing the form and arrangement of a catch device to be hereinafter referred to. Fig. 8 is a perspective view of a shaft or rod with which the sheet carrying drum is equipped, and which rod is operative for tightening the record sheet in its encircling engagement about the drum. Fig. 9 is a perspective view of an eccentric comprised in the operating means for the odometer.

Similar characters of reference indicate corresponding parts in all of the views.

In the drawings,—A represents a speed indicator which advantageously may be of a description set forth in Letters Patent of the United States granted Oct. 10, 1905, No. 801,605. Such speed indicating device comprises a main governor casing $b$ supporting at its top a casing extension E made with a cylindrical portion $c$ and with a flat portion $d$ having a slot $h$ vertically through its front and having a speed-indicating scale card $e$ on the outer side of such front; the speedometer, furthermore, comprises a centrifugal governor B within said main casing $b$ in which is included an operating rotary spindle $f$ associated with which is a stem $g$ which constitutes a member the position of which is variable and controlled by the speeding of the vehicle with which the governor spindle $f$ by a flexible shaft H is connected. The said stem carries a head $i$ which partakes of the governor controlled rising and falling movement of the said stem, and it has a transverse stud $i^2$ projecting through the slots of the indicator casing extension and scale card and carries a speed indicating pointer $i^3$ movable relatively to and registering on the graduated scale card. The cylindrical portion $c$ of the casing extension to the rear or otherwise suitably offset from the flat faced front $d$ is open at its top.

F represents an axially vertical drum which constitutes a support for a record sheet $x$, said drum being located within the cylindrical shell like portion of the casing extension and at its lower end has a central socket $j$ which engages over a journal stud $j^2$ upstanding above the top of the main casing of the speedometer. The said drum has at its upper end an upstanding clutch member, which, in the present instance, is shown as in the form of a hub $k$ having a transverse slot $k^2$; and J represents a clockworks, the case or frame of which is made with a circular shoulder $l$ whereby the clockworks may be supported by, and have its location within, the upper portion of the casing extension above the upper end of the record sheet supporting drum.

The clockworks has a rotation imparting connection with the drum through means of the shaft or arbor $m$ on which the hour hand is carried, which arbor depends for a short distance below the clockworks mechanism and carries a radial stud $m^2$ which engages in the clutch slot of the drum hub $k$. The drum is made with a recess $n$ in its side within or adjacent which is a shaft or rod $o$ rotatably supported by the drum parallel with the drum axis. Said rod has a longitudinal slot $o^2$ for the engagement therein of the end of the drum encircling record sheet $x$.

After the record sheet shall have been adjusted in its encircling engagement around the drum with its end portions in proximity and slipped into or through the slot $o^2$ of the rod, the latter is turned more or less through means of the knurled thumb knob $o^3$ to tighten the sheet; and the retention of the sheet in its tightened condition is insured by the engagement with the ratchet wheel $o^4$, fixed on the rod $o$, of the spring click $o^5$.

Reverting to the head $i$ of the variably movable stem comprised in the governor controlled speedometer it will be seen that there is associated with these parts a spring arm $p$ which in the present instance is shown as a return bent or U-shaped strip affixed to and carried by the said head $i$; and on the free yielding end of this spring arm is carried a stylus $q$ or other appropriate marker.

The record sheet as represented in Fig. 6 has parallel longitudinal speed lines $x^2$ which in practice may correspond as to distance of separation and arrangement with the speed lines on the indicating card $e$ of the speedometer; and said record sheet moreover has transverse time indicating lines $y$ regularly spaced to correspond to hours and subdivisions thereof; and in the present exemplification a record sheet for a 12 hour period is represented.

The drum is shown as having a short depending abutment or catch stud $t$ at its bottom coacting with which is a latch or catch $r$ pivoted at $r^2$ on the top of the main indicator casing, closely below the drum, and an arm of said catch projects through a slot in the side of the casing extension $c$. The spring $s$ keeps the latch normally in its position against the stop pin $s^2$ and with its catch shoulder across the path of revolution which the aforementioned depending stud $t$ has with the drum.

Preparatory to making use of the present indicating and recording device, the clockworks is lifted away from the top of the casing extension $c$, at which time it may be wound up. The drum is also lifted out from its inclosure and a blank record sheet is adjusted and tightened about the drum. The drum is replaced within its inclosure and on its lower end journal and so turned as to bring its catch stud $t$ in engagement with the catch $r$; and now the record sheet may be so relatively located that the marker $q$ will be coincident with the first transverse time line $y$ and coincident with the datum or zero line longitudinally found at the base of the record sheet. The clockworks will be next set in its place of fit within the upper circular portion of the casing extension and clutch engaged so that its hour shaft or arbor will be in driving connection with the drum. And now the catch will be pressed to free it from the catch stud $t$, liberating the clock mechanism and drum in connection therewith for their continuous and regularly running movements.

The speedometer being in driving connection with the vehicle on which it is mounted will remain inactive during any time in which the vehicle is not traveling, but so soon as the vehicle commences to travel the speed of its movement will be recorded by a line on the record sheet, which will be an ascending line, always on an increasing speed, a horizontal line on a uniform speed, and a descending line on a decreasing speed; and the times, reckoning from the starting moment, of the speeds and the rates thereof will also be shown on the sheet by their locations on or between the time lines.

Assuming that this apparatus is used on a locomotive, under instructions to the engineer to adjust and start the mechanism at the hour at which he goes on duty, the record sheet after his twelve hour or otherwise long run, on inspection, will show at what time the locomotive was started, the various speeds and times thereof of the travel and the intermediate times and durations of stoppages.

An odometer is combined with the speed indicating and recording mechanism, one of a comparatively well known kind being represented at L and having on the operating shaft $u$ thereof an internal gear wheel $u^2$.

As a means for actuating the odometer in conjunction with the speed indicating and recording devices, an eccentric $v$ is affixed on the operating spindle of the centrifugal governor comprised in the speedometer, and it is encircled by an eccentric strap $v^2$ having a pawl extension $v^3$, the pawl of which is constituted by a stud $v^4$. This eccentric actuated pawl coacts with a ratchet wheel $w$ on a vertical shaft $w^2$ which is journaled in suitable bearings therefor in the top wall of the main indicator casing $b$; and the spring $w^3$ keeps the pawl to its work in relation to the said ratchet wheel. The shaft on which the ratchet wheel is carried has formed thereon or provided thereto a worm $z$ in mesh with which is an axially horizontally mounted worm wheel $z^2$ unitary with which is a pinion $z^3$ which is in mesh with the annular gear wheel $u^2$ which actuates the odometer.

In Figs. 1 and 1$^a$ a form of driving connection between a locomotive or car wheel and the speedometer is shown. The indicator operating rotative spindle of the speedometer projects downwardly through an externally screw threaded hub like extension $b^2$ of the indicator casing and has a convex bearing surface $b^3$ within its end. M represents a section formed with a ball end $M^2$ to bear in said concavity $b^3$ and has an axial passage $M^3$ therethrough which is upwardly flaring at the ball ended portion. N represents an annular coupling piece having internal screw threads at its upper portion and having its wall at its lower portion to partially surround and to have an engagement with the ball ended portion of the section M, such coupling piece when screw engaged on the part $b^2$ keeping the rounded portion of the section M to its bearing in the concavity therefor. P is a short section of flexible shaft connected with the lower end of the indicator operating spindle $f$ and it carries at its lower end a comparatively short rigid shaft section having a clutch fin or rib $P^3$ below the lower externally screw threaded portion of the tubular section M. A suitably long flexible shaft H has a slotted clutch stud $H^2$ at its end adjacent the speedometer in engagement with the clutch member formed as an appurtenance of the short flexible shaft section P; and the opposite end of this flexible shaft has connection with and to be driven from a small gear wheel or pinion Q which is in mesh with a gear wheel $Q^2$ on a wheel carrying axle of the locomotive or car. A tubular metallic sheath R incloses the long flexible shaft H, has a screw engagement at its upper end with the threaded portion of the oscillatory section N, and by an internal shoulder $R^2$ maintains the clutch hub $H^2$ of the shaft up to its engagement with its fellow clutch member $P^3$. The shaft and its protecting sheath may be either rigid or flexible, as best suits different uses. When a rigid shaft is used it may be connected at each angle by universal joints, spiral or bevel gears.

The coupling and connections just above described are such as to allow ample deflection of the shaft H and its casing in any direction from the axis of the indicator operating spindle and yet to protect the portion of the flexible shaft which is next to the speedometer from being too sharply bent to thereby become comparatively quickly broken, worn out, or otherwise impaired.

Various changes from the constructions and arrangements here shown and particularly described may be made without departing from my invention or sacrificing any of the advantages thereof; and it is expressly stated in this connection that I may employ a speedometer of widely different character and construction from that here shown and referred to.

I claim:—

1. The combination with a drum and means for confining a record sheet in supporting engagement upon and around it, and a clockworks having a rotation imparting connection with the drum, of a speed indicating device comprising an indicator casing having a slotted front and a scale card thereat, located opposite and adjacent the drum, a centrifugal governor comprising a vertical stem, having its upper portion between the slotted front and drum, endwise movable in degree proportionate to the speeding of the governor, a vertically apertured head, rotatively loose, but endwise immovable, relatively to the upper extremity of said stem, provided with a transverse stud, projecting through the slot of the indicator casing, said stud having a pointer movable on the face of the scale card, and said head also carrying at its side opposite said stud a return bent spring arm provided with a marker for operating against the drum carried record sheet simultaneously with the coaction of the pointer with the scale card.

2. The combination with a speed indicator, and means for operating it, said indicator comprising a member movable in extent proportionate to the speed of operation of the indicator, and carrying a marker, of a drum, adapted to receive engagement around same, and to support, a record sheet on which said marker is operative, and having at its upper end a clutch member, a clockworks mechanism removably mounted above said drum and having a rotative depending shaft thereof provided with a clutch member adapted when the clockworks mechanism is removed from and returned adjacent the drum to disengage, and reëngage the clutch member on the drum.

3. The combination with a speed indicating device having a variably movable member, of a drum having a recess in its side, a shaft parallel with the axis of the drum adjacent said recesses, and having a longitudinal slot for the engagement therein of the ends of a drum encircling record sheet, means for rotating said shaft for tensioning the sheet, means for confining the shaft in its sheet tensioning position, means for rotating the drum at a uniform speed and a marker carried by said movable speed-indicator member, and recording on the drum-carried sheet.

4. The combination with a support for a record sheet, and means for imparting a uniform progressive movement thereto, of a speed indicating device comprising a rotary spindle and a member the position of which is variable and controlled by the speed of rotation of the spindle, a marker carried by said variably movable member and for recording on said sheet, an eccentric revolubly actuated by said rotary spindle, an eccentric strap engaged about the eccentric and having a pawl extension, a ratchet wheel intermittently actuated by said pawl, an odometer supported on the speed indicating device having an operating wheel, and driving connections between said ratchet wheel and said odometer operating wheel.

5. The combination with a support for a record sheet, and means for imparting a uniform progressive movement thereto, of a speed indicating device comprising a rotary spindle and a member the position of which is variable and controlled by the speed of rotation of the spindle, a marker carried by said variably movable member and for recording on said sheet, an eccentric carried by said rotary spindle, an eccentric strap engaged about the eccentric and having a pawl extension, a ratchet wheel intermittently actuated by said pawl, an odometer supported on the speed indicating device having an operating gear wheel, a shaft on which said ratchet wheel is carried, having a worm, a worm wheel in mesh with said worm, and having, associated therewith a pinion which is in mesh with the driving gear wheel of the odometer.

6. In combination, a speed indicating device comprising a casing, an indicator operating rotative spindle located within the casing and having an end portion extended therethrough having a flexible shaft connected therewith, a ball-ended section having an axial passage therethrough which is flaring at one end thereof and fitted in a concave socket therefor in the portion of the governor casing through which the aforesaid spindle is extended, an annular coupling piece externally screw engaging the last named portion of the casing and having its wall at one end portion contracted, for the retention in engagement therewith of the ball-ended portion of said section.

Signed by me at Springfield, Mass., in presence of two subscribing witnesses.

RICHARD HALE SMITH.

Witnesses:
M. A. BERRY,
FRANK A. WAKEFIELD.